United States Patent
Park

(10) Patent No.: US 10,097,779 B2
(45) Date of Patent: Oct. 9, 2018

(54) METHOD AND APPARATUS FOR STORING EVENT SIGNAL AND IMAGE, AND OPERATING METHOD OF VISION SENSOR FOR TRANSMITTING EVENT SIGNAL TO STORING APPARATUS

(71) Applicant: SAMSUNG ELECTRONICS CO., LTD., Suwon-si (KR)

(72) Inventor: Jin-Man Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 15/049,382

(22) Filed: Feb. 22, 2016

(65) Prior Publication Data

US 2017/0127005 A1    May 4, 2017

(30) Foreign Application Priority Data

Oct. 30, 2015  (KR) .................. 10-2015-0152008

(51) Int. Cl.
| | |
|---|---|
| *H04N 5/3745* | (2011.01) |
| *H04N 1/00* | (2006.01) |
| *H04N 5/351* | (2011.01) |
| *G06F 12/10* | (2016.01) |
| *G06F 11/30* | (2006.01) |

(Continued)

(52) U.S. Cl.
CPC .......... *H04N 5/37452* (2013.01); *G06F 9/32* (2013.01); *G06F 11/30* (2013.01); *G06F 12/1018* (2013.01); *G08B 13/19669* (2013.01); *H04N 1/00* (2013.01); *H04N 5/335* (2013.01);
(Continued)

(58) Field of Classification Search
CPC ...... H04N 5/37452; H04N 1/00; H04N 5/351; H04N 5/376; H04N 5/335; H04N 7/18; G08B 13/19669; G06F 12/1018; G06F 11/30; G06F 9/32; G06F 2212/1028
See application file for complete search history.

(56) References Cited

U.S. PATENT DOCUMENTS

| | | |
|---|---|---|
| 7,971,030 B2 | 6/2011 | O'Sullivan |
| 8,965,175 B2 | 2/2015 | Fiore et al. |

(Continued)

FOREIGN PATENT DOCUMENTS

| | | |
|---|---|---|
| EP | 2672386 A3 | 12/2013 |
| JP | 11232097 A | 8/1999 |

(Continued)

OTHER PUBLICATIONS

Bichler et al., "Extraction of temporally correlated features from dynamic vision sensors with spike-timing-dependent plasticity", Neural Networks, 2012, 10 pages total, Elsevier Ltd., France.

(Continued)

*Primary Examiner* — Albert Cutler
(74) *Attorney, Agent, or Firm* — Sughrue Mion, PLLC

(57) ABSTRACT

A method and apparatus for storing an event signal and an image, and an operating method of a vision sensor for transmitting an event signal to a storing apparatus, are provided. The storing method includes receiving an event signal from a vision sensor at a time, determining an event address of an area of a memory based on the time at which the event signal is received, and storing the event signal in the area corresponding to the event address.

12 Claims, 9 Drawing Sheets

(51) Int. Cl.
- *H04N 5/376* (2011.01)
- *G08B 13/196* (2006.01)
- *G06F 9/32* (2018.01)
- *H04N 5/335* (2011.01)
- *H04N 7/18* (2006.01)
- *G06F 12/1018* (2016.01)

(52) U.S. Cl.
CPC ............ *H04N 5/351* (2013.01); *H04N 5/376* (2013.01); *G06F 2212/1028* (2013.01); *H04N 7/18* (2013.01)

(56) References Cited

U.S. PATENT DOCUMENTS

| | | |
|---|---|---|
| 2003/0015647 A1* | 1/2003 | Guo .................. H04N 3/155 250/208.1 |
| 2003/0133614 A1 | 7/2003 | Robins et al. |
| 2006/0255241 A1 | 11/2006 | Shibao |
| 2010/0182468 A1 | 7/2010 | Posch et al. |
| 2014/0009648 A1 | 1/2014 | Kim et al. |
| 2014/0231623 A1 | 8/2014 | Serrano Gotarredona et al. |

FOREIGN PATENT DOCUMENTS

| | | |
|---|---|---|
| JP | 2007-43463 A | 2/2007 |
| JP | 2014-75750 A | 4/2014 |
| KR | 10-2013-0038758 A | 4/2013 |
| KR | 10-2014-0146337 A | 12/2014 |
| KR | 10-2015-0029285 A | 3/2015 |
| WO | 02082275 A1 | 10/2002 |
| WO | 2004015572 A1 | 2/2004 |

OTHER PUBLICATIONS

Piatkowska et al., "Asynchronous Stereo Vision for Event-Driven Dynamic Stereo Sensor Using an Adaptive Cooperative Approach", 2013, 6 pages total, IEEE Xplore, Austria.

Huber et al., "High-Speed Pose Estimation using a Dynamic Vision Sensor", Mar. 2014, 60 pages total, University of Zurich.

Hofstatter et al., "Multiple Input Digital Arbiter with Timestamp Assignment for Asynchronous Sensor Arrays", Electronics, Circuits and Systems, 2006. ICECS '06. 13th IEEE International Conference On, IEEE, PI, Dec. 1, 2006, pp. 228-231, XP031111468.

Communication dated Mar. 1, 2017 issued by the European Patent Office in counterpart European Patent Application No. 16163625.3.

Franco et al: "Event-based Image Processing using a Neuromorphic Vision Sensor" 2013, (6 pages total).

G. Bebis et al. (Eds.): "Event-based Stereo Matching Approaches for Frameless Address Event Stereo Data" ISVC 2011, Part I, LNCS 6938, pp. 674-685, 2011 (12 pages total).

* cited by examiner

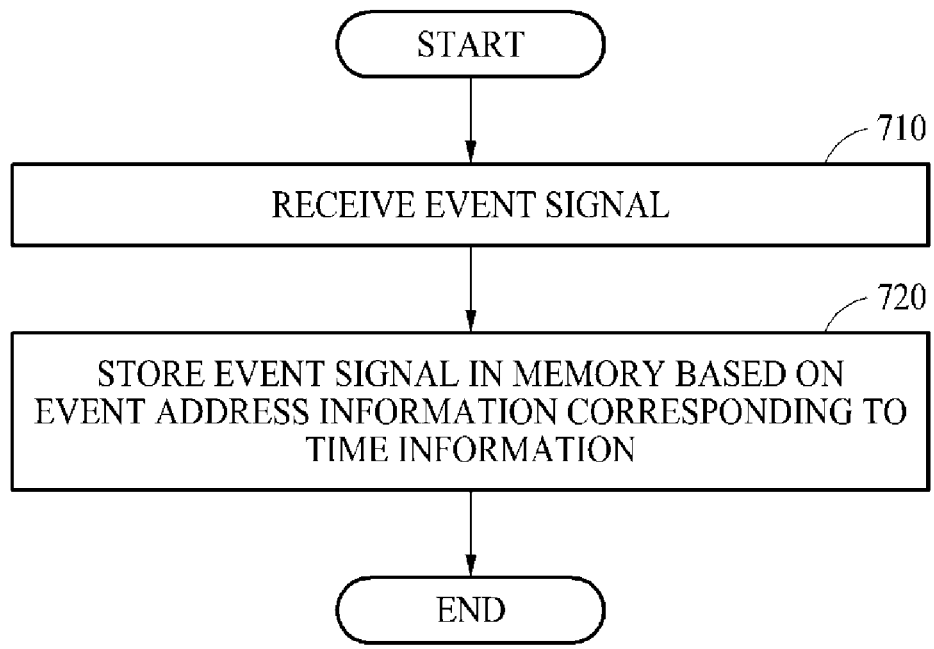

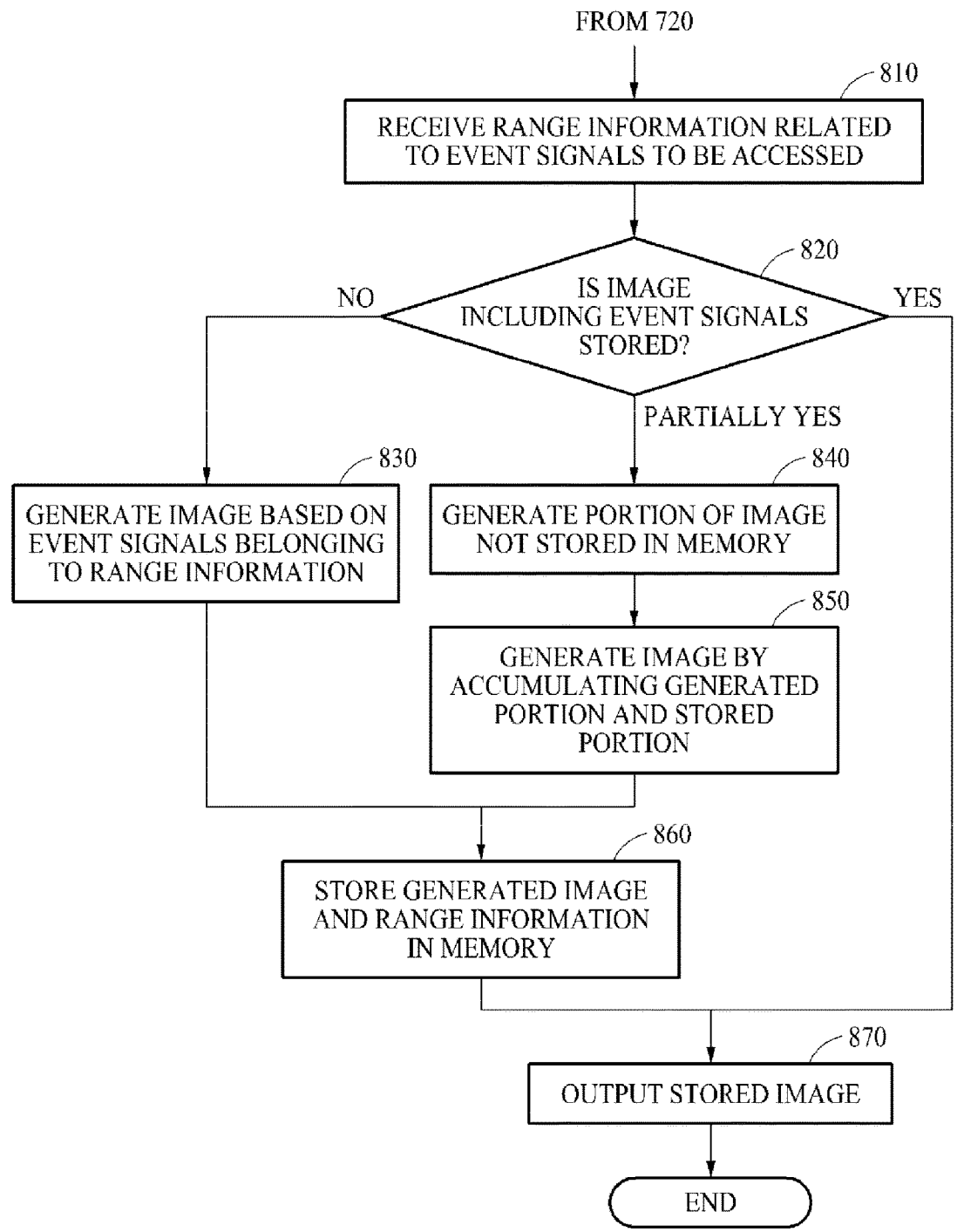

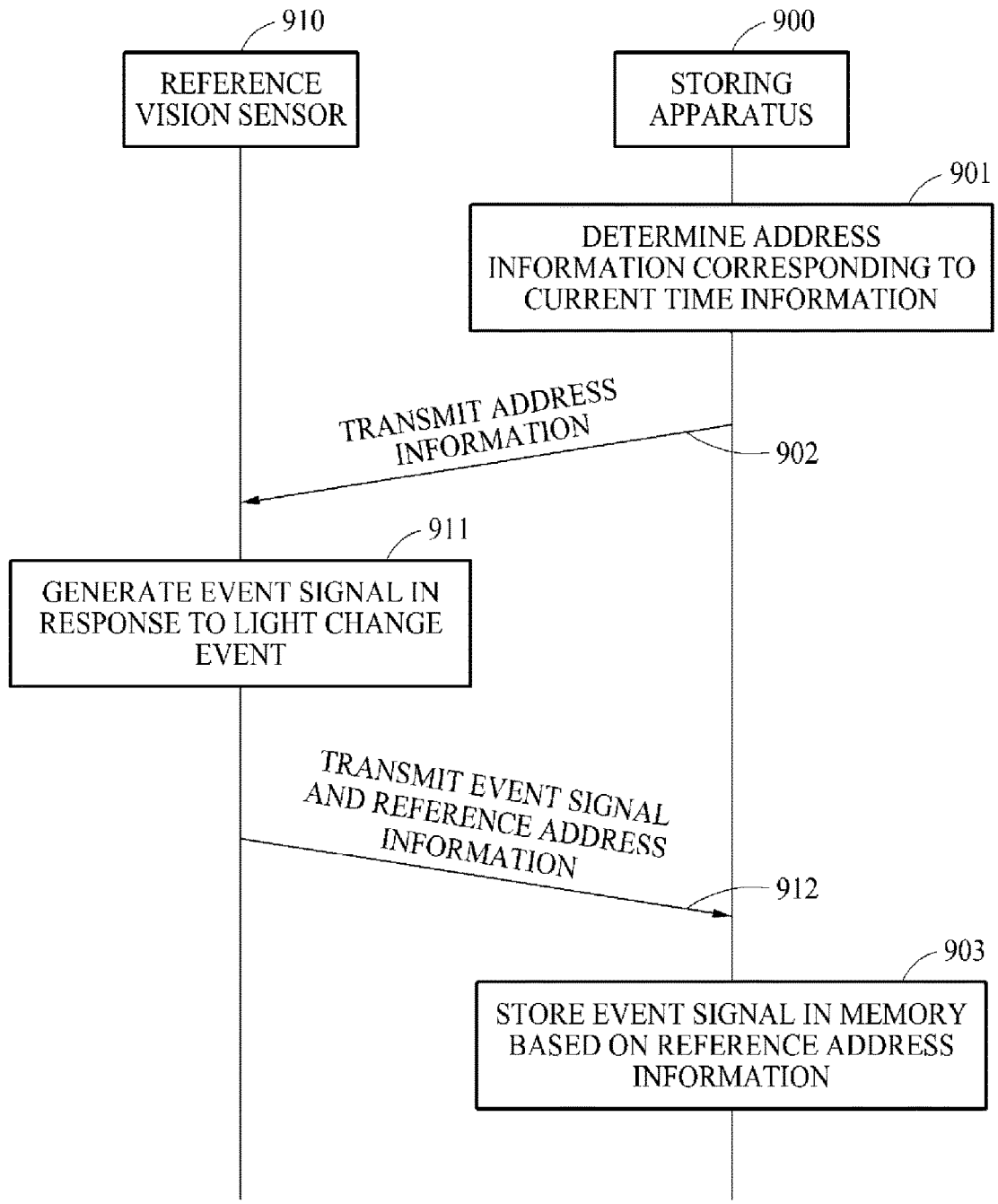

METHOD AND APPARATUS FOR STORING EVENT SIGNAL AND IMAGE, AND OPERATING METHOD OF VISION SENSOR FOR TRANSMITTING EVENT SIGNAL TO STORING APPARATUS

CROSS-REFERENCE TO RELATED APPLICATION

This application claims priority from Korean Patent Application No. 10-2015-0152008, filed on Oct. 30, 2015 in the Korean Intellectual Property Office, the disclosure of which is incorporated herein by reference in its entirety.

BACKGROUND

1. Field

Methods and apparatuses consistent with exemplary embodiments relate to a method and an apparatus for storing an event signal and an image, and an operating method of a vision sensor for transmitting an event signal to a storing apparatus.

2. Description of the Related Art

With the recent popularization of smart phones, utilization of an event-based vision sensor that operates using less computational complexity and less power consumption as compared to a frame-based vision sensor is increasing. The frame-based vision sensor outputs signals from all sensing elements for each frame, whereas the event-based vision sensor time-asynchronously outputs a signal only from a sensing element in which an intensity of light changes, thereby reducing computational complexity and power consumption.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a storing method including receiving an event signal from a vision sensor at a time, determining an event address of an area of a memory based on the time at which the event signal is received, and storing the event signal in the area corresponding to the event address.

The determining may include determining the event address based on the time at which the event signal is received, using a hash function.

The event address may be uniquely mapped to the time at which the event signal is received.

The method may further include receiving range information of event signals to be accessed, determining image address information of another area of another memory based on the range information, and determining whether an image including the event signals is stored in the other memory based on the image address information.

The determining whether the image is stored in the other memory may include determining whether the image is stored in the other area corresponding to the image address information.

The method may further include, in response to the determining that the image is not stored in the other memory, generating the image including the event signals corresponding to the range information, storing the image and the range information in the other area corresponding to the image address information, and outputting the stored image.

The method may further include, in response to the determining that a first portion of the image is stored in the other memory, generating a second portion of the image, the second portion including at least one event signal that corresponds to the range information and is not stored in the other memory, generating the image including the first portion and the second portion, storing the image and the range information in the other area corresponding to the image address information, and outputting the stored image.

The method may further include outputting the stored image in response to the determining that the image is stored in the other memory.

A non-transitory computer-readable storage medium may store a program to cause a computer to perform the method.

According to an aspect of another exemplary embodiment, there is provided a storing method including transmitting, to vision sensors, addresses of a memory, receiving, from a vision sensor among the vision sensors, an event signal and an address that is received by the vision sensor when the vision sensor generates the event signal, among the addresses, and storing the event signal in the memory based on the address.

The transmitting may include transmitting, to the vision sensors, different addresses of the memory to which a current time and respective items of identification information of the vision sensors are mapped.

The addresses may indicate respective areas of the memory, and the areas may have respective capacities corresponding to sensibilities of the vision sensors.

The storing may include storing the event signal in an area of the memory, the area corresponding to the address.

The transmitting may include transmitting, to the vision sensors, the addresses at preset intervals.

According to an aspect of another exemplary embodiment, there is provided an operating method of a vision sensor, the method including generating an event signal in response to an event in which light received from an object changes, receiving, from a storing apparatus, an address of an area of a memory of the storing apparatus when the event signal is generated, and transmitting, to the storing apparatus, the event signal and the address indicating the area in which the event signal is to be stored.

The address may be mapped to a time at which the address is transmitted from the storing apparatus to the vision sensor.

According to an aspect of another exemplary embodiment, there is provided a storing apparatus including a communicator configured to receive an event signal from a vision sensor at a time, and a processor configured to determine an event address of an area of a memory based on the time at which the event signal is received, and store the event signal in the area corresponding to the event address.

The communicator may be further configured to receive range information of event signals to be accessed, and the processor may be further configured to determine image address information of another area of another memory based on the range information, determine whether an image including the event signals is stored in the other memory based on the image address information, and generate the image including the event signals corresponding to the range information, and store the image and the range information in the other area corresponding to the image address information, in response to the processor determining that the image is not stored in the other memory.

According to an aspect of another exemplary embodiment, there is provided a storing apparatus including a communicator configured to transmit, to vision sensors, addresses of a memory, and receive, from a vision sensor among the vision sensors, an event signal and an address that is received by the vision sensor when the vision sensor generates the event signal, among the addresses. The storing apparatus further includes a processor configured to store the event signal in the memory based on the address.

The communicator may be further configured to transmit, to the vision sensors, different addresses of the memory to which a current time and respective items of identification information of the vision sensors are mapped.

BRIEF DESCRIPTION OF THE DRAWINGS

The above and/or other aspects will be more apparent by describing exemplary embodiments with reference to the accompanying drawings, in which:

FIG. 7 is a flowchart illustrating a storing method according to an exemplary embodiment;

FIG. 8 is a flowchart illustrating a process of storing and outputting a generated image in response to range information, according to an exemplary embodiment; and FIG. 9 is a diagram illustrating a storing method according to another exemplary embodiment.

DETAILED DESCRIPTION

Figure 1:
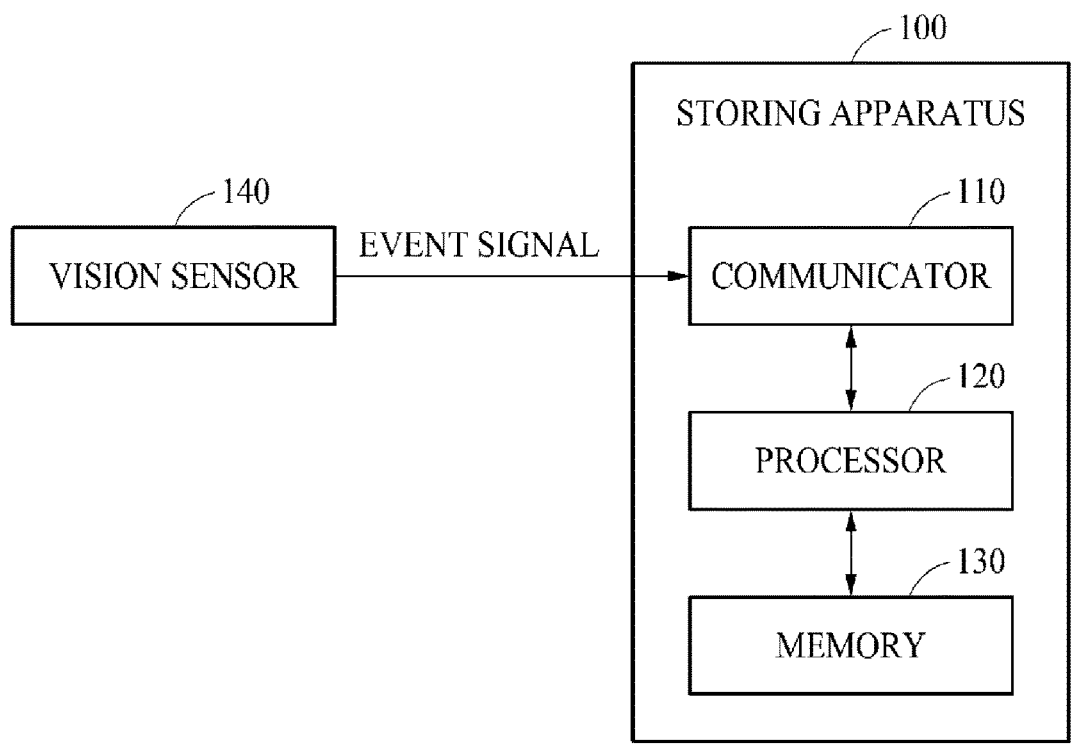
FIG. 1 is a block diagram illustrating a storing apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "includes", "including", "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Examples may be implemented as various types of products, for example, personal computers, laptop computers, tablet computers, smart phones, televisions, smart home appliances, intelligent vehicles, and wearable devices. For example, the examples may be applied to storing and utilizing a signal received from a sensor in a smart phone, a mobile device, and a smart home system.

FIG. 1 is a block diagram illustrating a storing apparatus 100 according to an exemplary embodiment.

Referring to FIG. 1, the storing apparatus 100 includes a communicator 110, a processor 120, and a memory 130. The storing apparatus 100 is an apparatus that stores an event signal generated by a vision sensor 140, and may be provided in various computing devices and/or systems such as, for example, a smart phone, a tablet computer, a laptop computer, a desktop computer, a television, a wearable device, a security system, and a smart home system. The storing apparatus 100 may store an image generated by accumulating event signals generated by the vision sensor 140. The storing apparatus 100 may be widely used in fields of image processing, image recognition, and image monitoring using the event signals generated by the vision sensor 140.

The vision sensor 140 is a device that generates at least one event signal by sensing at least a portion of an object that moves, and may include, for example, a dynamic vision sensor (DVS). The vision sensor 140 may include a plurality of sensing elements. A single sensing element may sense an occurrence of a predetermined event and output an event signal.

Unlike a frame-based vision sensor, for example, a complementary metal-oxide semiconductor (CMOS) image sensor (CIS), the vision sensor 140 may output an event signal from a sensing element in which an intensity of light changes, rather than scanning outputs of sensing elements in frame units.

An event in which light received by the vision sensor 140 changes may occur due to a movement of an object. Hereinafter, an event in which light changes will be simply referred to as a light change event. For example, in a case in which a light source is substantially fixed over time and an object does not emit light autonomously, the light received by the vision sensor 140 may be light emitted from the light source and reflected by the object. In a case in which all of the object, the light source, and the vision sensor 140 are stationary, light reflected by the stationary object may not substantially change. Thus, an intensity of light may not change, and the vision sensor 140 may not sense a light change event. Conversely, when the object moves, the light reflected by the moving object may change in response to the movement of the object. Thus, a brightness of light may change, and the vision sensor 140 may sense a light change event. Here, the movement of the object may include the movement of the object itself and relative movements between the object and the vision sensor 140 in response to a movement of the vision sensor 140.

An event signal output in response to the movement of the object may be time-asynchronously generated information, in detail, information similar to an optic nerve signal delivered from a retina to a brain of a human. For example, the event signal may occur when a moving object is sensed, and may not occur with respect to a stationary object.

The vision sensor 140 may also output a time at which the intensity of the light changes. In this example, the vision sensor 140 outputs a time at which the event signal is generated as a relative number. The vision sensor 140 may output an event signal and a relative number that increases gradually each time an event signal is generated.

The vision sensor 140 may utilize address information or address/time information of a sensing element sensing a light change event. Thus, the vision sensor 140 may considerably reduce an amount of data to be processed, compared to the frame-based vision sensor. For example, a response rate of the event-based vision sensor may be measured in a unit of less than microsecond (μs).

The communicator 110 may receive an event signal from the vision sensor 140. The communicator 110 may receive, from the vision sensor 140, the event signal time-asynchronously generated in response to a light change event.

The processor 120 may store the event signal in the memory 130 based on event address information corresponding to time information related to a time at which the event signal is received.

The time information may indicate a system time of the storing apparatus 100 at which the event signal is received. The processor 120 may determine the event address information based on the time information. The event address information may indicate a memory area in which the received event signal is to be stored, and may be uniquely mapped to the time information.

The processor 120 may store the event signal in the memory area indicated by the determined event address information. For example, when event signals are received at different times, the event signals may be stored in different areas of the memory 130.

The memory 130 may store the event signal received from the vision sensor 140. The memory 130 may store the event signal in the memory area indicated by the event address information corresponding to the time information.

The storing apparatus 100 may generate an image by accumulating event signals stored in the memory 130. In this example, the components of the storing apparatus 100 may operate as follows.

The communicator 110 may receive range information related to event signals to be accessed from a user. The range information may indicate a range of time information of an event signal to be accessed by the user, and may include, for example, information related to a start time and an end time or information related to a start time and an interval. For example, the communicator 110 may receive range information input from the user through an interface included in the storing apparatus 100, or may receive range information from an external device of the storing apparatus 100.

The processor 120 may verify whether an image including the event signals is stored in the memory 130 based on image address information corresponding to the range information. The image address information may be uniquely mapped to the range information, and indicate a memory area in which the image including the event signals belonging to the range information is to be stored. The processor 120 may verify whether the image is stored in the memory area indicated by the image address information, thereby verifying whether the image is stored in the memory 130.

The processor 120 may perform a predetermined operation based on whether the image is stored in the memory 130. The operation of the processor 120 performed based on whether the image is stored will be described with reference to FIGS. 3 and 4.

Figure 2:
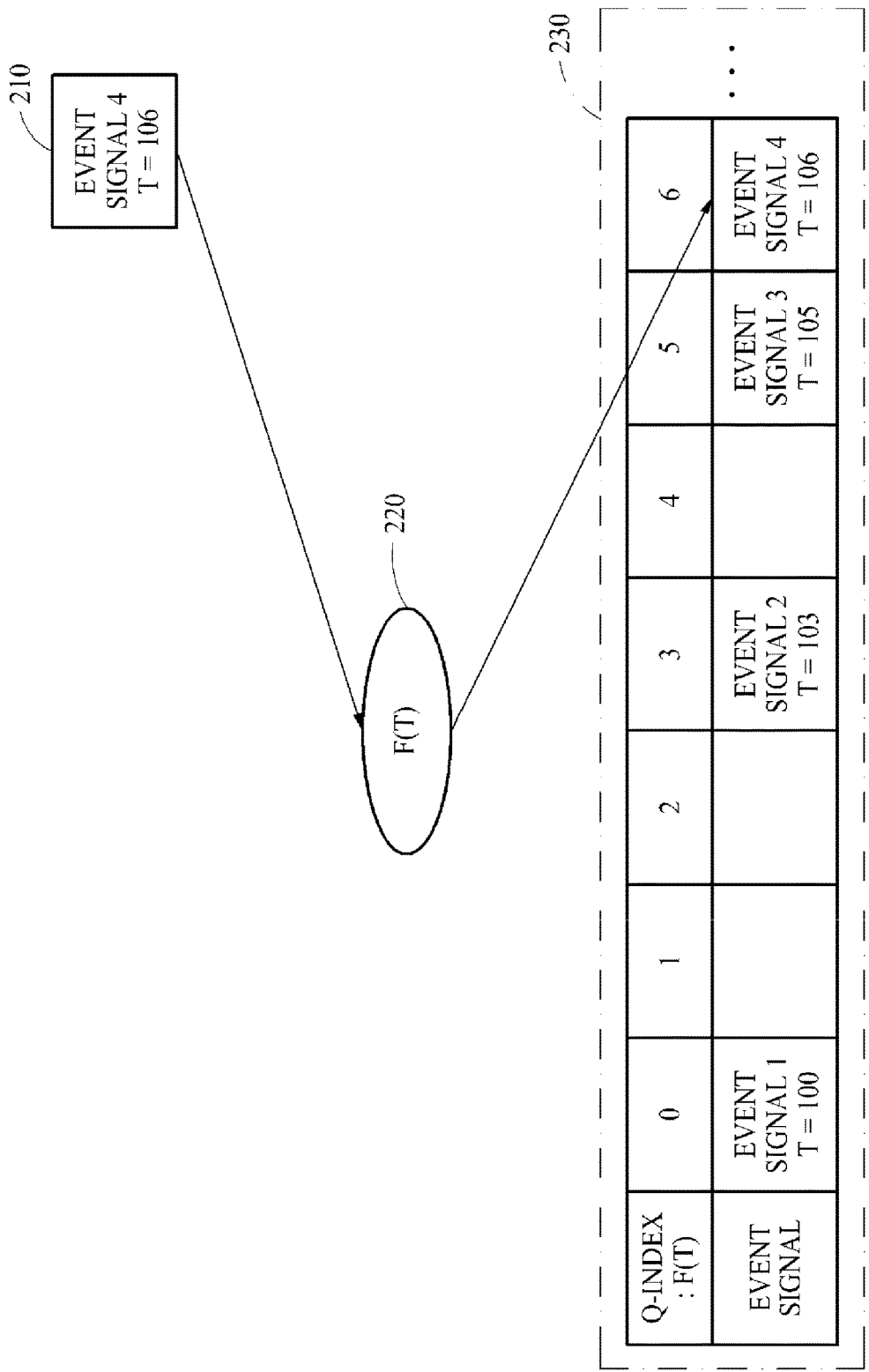
FIG. 2 is a diagram illustrating a process of storing an event signal in a memory, according to an exemplary embodiment.

FIG. 2 is a diagram illustrating a process of storing an event signal in a memory 230, according to an exemplary embodiment.

Referring to FIG. 2, an example in which a storing apparatus stores an event signal 4 210 received at T=106 in the memory 230 is illustrated. Here, T=106 may indicate time information related to a time at which the event signal 4 210 is received. The memory 230 includes a plurality of areas in which event signals may be stored, and the plurality of areas may be indicated by event address information, for example, queue indices (Q-indices) or array indices.

The storing apparatus may determine event address information corresponding to the time information T=106 using a hash function 220. The hash function 220 refers to a function to output event address information corresponding to input time information. For example, a look-up table in which time information and event address information are mapped to each other may be used. The time information and the event address information may be uniquely mapped to each other. In detail, different items of time information may not be mapped to a single item of event address information, and different items of time information may be mapped to different items of event address information.

In the example of FIG. 2, the storing apparatus may determine event address information corresponding to the time information T=106 to be a Q-index 6 using the hash function 220. The storing apparatus may store the event signal 4 210 in a memory area indicated by the Q-index 6.

The event address information may be uniquely mapped to the time information of the received event signal. Thus, in a case in which an event signal is not received at a time corresponding to predetermined time information, the event signal may not be stored in a memory area indicated by event address information corresponding to time information. Referring to the memory 230 of FIG. 2, an event signal 1 received at T=100 may be stored in a memory area indicated by event address information, for example, a Q-index 0. Conversely, because an event signal is not received at T=101, an event signal may not be stored in a memory area indicated by event address information, for example, a Q-index 1.

Figure 3:
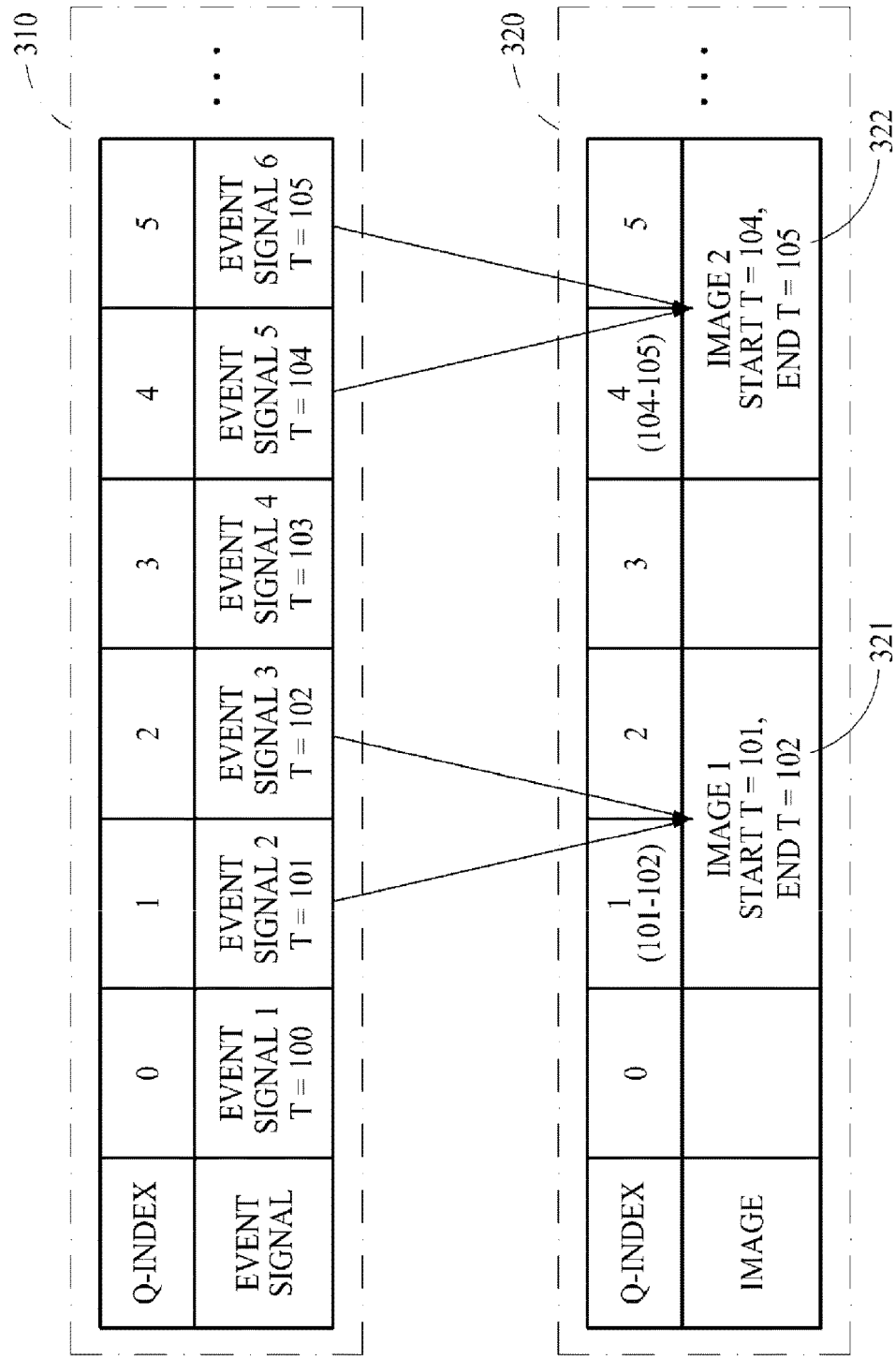
FIG. 3 is a diagram illustrating a process of generating an image based on event signals, according to an exemplary embodiment.

FIG. 3 is a diagram illustrating a process of generating an image based on event signals, according to an exemplary embodiment.

Referring to FIG. 3, event signals received from a vision sensor may be stored in a memory 310. Images generated by accumulating at least one event signal may be stored in a memory 320. The images may be specified based on range information. The memory 320 may be a device configured to cache the generated image by maintaining the generated image for a predetermined time period.

For example, a storing apparatus may generate an image 1 321 based on an event signal 2 and an event signal 3 corresponding to range information 1 including a start time T=101 and an end time T=102. The image 1 321 may be stored in a memory area indicated by image address information corresponding to the range information 1, for example, Q-indices 1-2. Thus, when the range information 1 is received, the storing apparatus may verify whether the image 1 321 is stored in the memory area indicated by the Q-indices 1-2 corresponding to the range information 1, thereby verifying whether the first image 1 321 is stored in the memory 320.

The storing apparatus may generate an image 2 322 based on an event signal 4 and an event signal 5 corresponding to range information 2 including a start time T=104 and an end time T=105. The image 2 322 may be stored in a memory area indicated by image address information corresponding to the range information 2, for example, Q-indices 4-5. Similarly, when the range information 2 is received, the storing apparatus may verify whether the image 2 322 is stored in the memory area indicated by the Q-indices 4-5 corresponding to the range information 2, thereby verifying whether the image 2 322 is stored in the memory 320.

Figure 4:
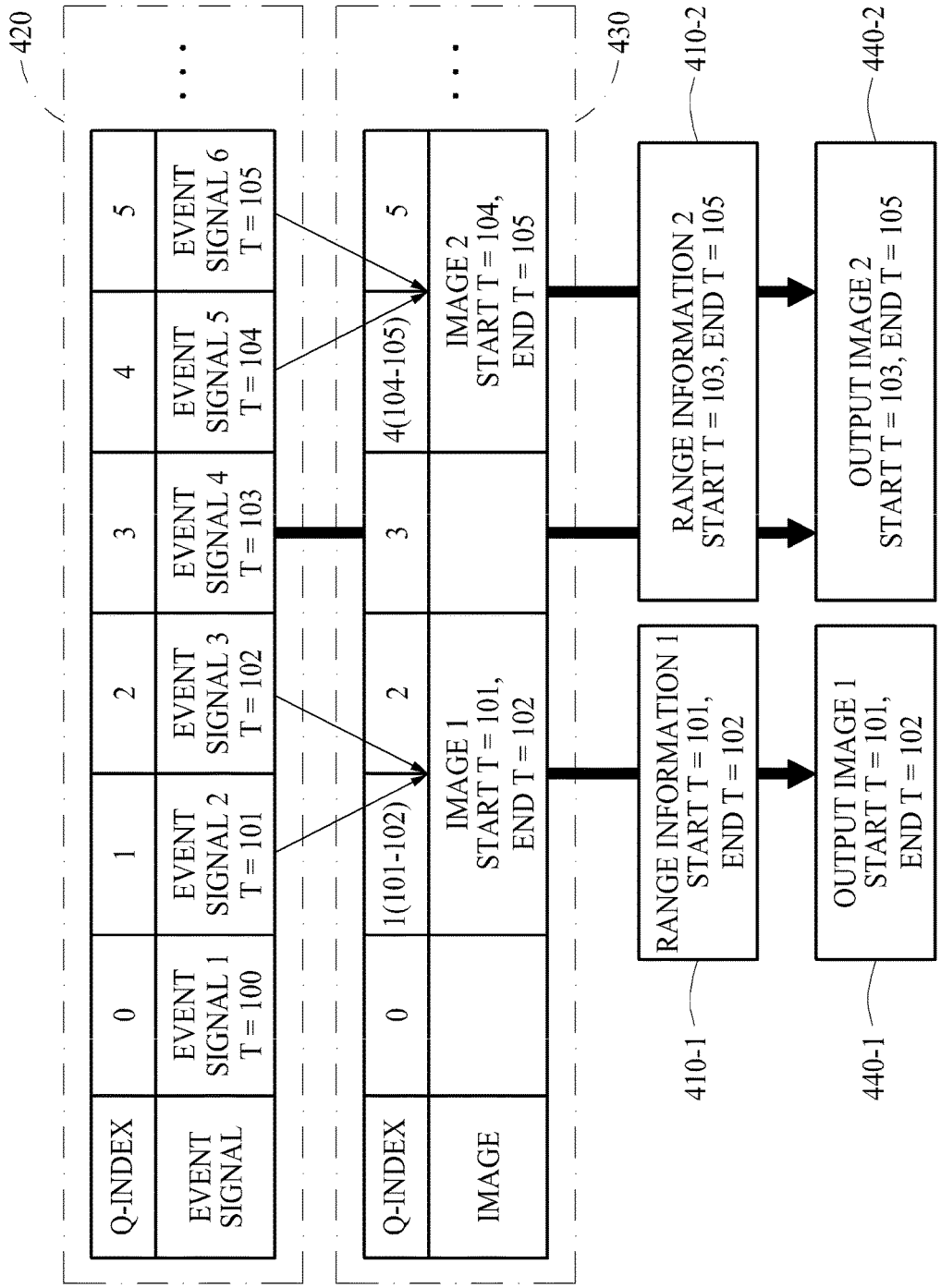
FIG. 4 is a diagram illustrating a process of outputting an image in response to range information, according to an exemplary embodiment.

FIG. 4 is a diagram illustrating a process of outputting an image in response to range information, according to an exemplary embodiment.

Referring to FIG. 4, an example in which an output image 1 440-1 is determined in response to range information 1 410-1 received from a user, and an example in which an output image 2 440-2 is determined in response to range information 2 410-2 received from the user, are illustrated.

The range information 1 410-1 may include a start time T=101 and an end time T=102 as information related to event signals to be accessed by the user.

A storing apparatus may verify whether an image including event signals belonging to the range information 1 410-1, for example, an event signal 2 and an event signal 3, is stored in a memory 430. For example, the storing apparatus may verify whether the image is stored in a memory area (of the memory 430) indicated by image address information corresponding to the range information 1 410-1, for example, Q-indices 1-2. When the image, for example, an image 1, is stored in the memory area indicated by the Q-indices 1-2, the storing apparatus may determine the stored image to be the output image 1 440-1.

Conversely, when the image is not stored in the memory area indicated by the Q-indices 1-2, the storing apparatus may generate an image by accumulating the event signal 2 and the event signal 3 belonging to the range information 1 410-1, among event signals stored in a memory 420. The storing apparatus may store the generated image and the range information 1 410-1 in the memory area indicated by the Q-indices 1-2, and determine the stored image to be the output image 1 440-1.

The range information 2 410-2 may include a start time T=103 and an end time T=105 as information related to event signals to be accessed by the user.

The storing apparatus may verify whether an image including event signals belonging to the range information 2 410-2, for example, an event signal 4 through an event signal 6, is stored in the memory 430. For example, the storing apparatus may verify whether the image is stored in a memory area (of the memory 430) indicated by image address information corresponding to the range information 2 410-2, for example, Q-indices 3-5.

As shown in FIG. 4, when only a first portion of the image, for example, an image 2, is stored in the memory 430, the storing apparatus may generate a second portion of the image, the second portion not being stored in the memory 430, based on an event signal 4 stored in the memory 420. The storing apparatus may generate the second portion of the image by obtaining an event signal corresponding to the second portion from the memory 420.

The storing apparatus may store an image generated by accumulating the first portion stored in the memory 430, for example, the image 2, and the generated second portion, and the range information 2 410-2 in the memory area indicated by the Q-indices 3-5, and determine the stored image to be the output image 2 440-2.

Figure 5:
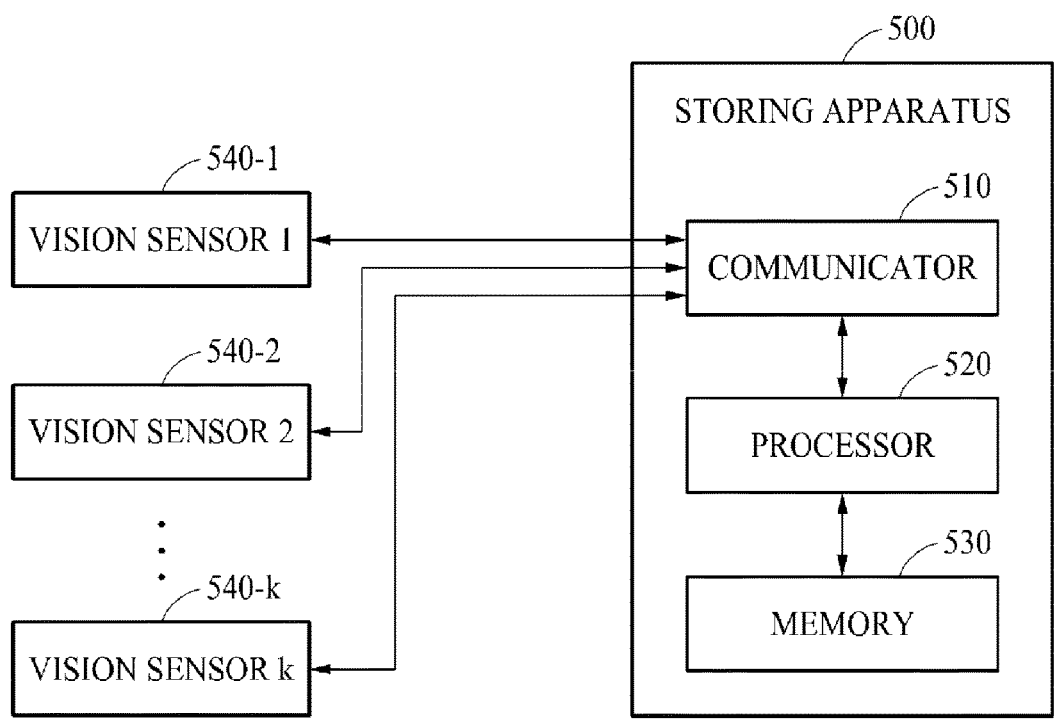
FIG. 5 is a block diagram illustrating a storing apparatus according to another exemplary embodiment.

FIG. 5 is a block diagram illustrating a storing apparatus according to another exemplary embodiment.

Referring to FIG. 5, a storing apparatus 500 includes a communicator 510, a processor 520, and a memory 530. The storing apparatus 500 may be an apparatus that stores event signals generated by vision sensors 540-1, 540-2, . . . , 540-$k$, and may be provided in various computing devices and/or systems such as, for example, a smart phone, a tablet computer, a laptop computer, a desktop computer, a television, a wearable device, a security system, and a smart home system. The storing apparatus 500 may be widely used in fields of image processing, image recognition, and image monitoring using the event signals generated by the vision sensors 540-1, 540-2, . . . , 540-$k$.

The communicator 510 may communicate with the vision sensors 540-1, 540-2, . . . , 540-$k$. The communicator 510 may transmit items of address information corresponding to current time information to the vision sensors 540-1, 540-2, . . . , 540-$k$. The communicator 510 may receive an event signal and reference address information corresponding to the event signal from a reference vision sensor that generates the event signal, among the vision sensors 540-1, 540-2, . . . , 540-$k$. In this example, the reference vision sensor may be a sensor that generates an event signal in response to a light change event, among the vision sensors 540-1, 540-2, . . . , 540-$k$.

The processor 520 may determine items of address information to be transmitted to the vision sensors 540-1, 540-2, . . . , 540-$k$. The processor 520 may determine different items of address information to which the current time information and items of identification information of the vision sensors 540-1, 540-2, . . . , 540-$k$ are mapped. For example, the processor 520 may determine address information 1 to which the current time information and identification information of the vision sensor 1 540-1 are mapped. Similarly, the processor 520 may determine address information 2 to which the current time information and identification information of the vision sensor 2 540-2 are mapped, and determine address information k to which the current time information and identification information of the vision sensor k 540-$k$ are mapped.

The current time information may indicate a time at which address information is determined and transmitted to a vision sensor. The address information may be information indicating a predetermined area of the memory 530 in which an event signal is to be stored.

The processor 520 may transmit the determined items of address information to the vision sensors 540-1, 540-2, . . . , 540-$k$. For example, the processor 520 may transmit the address information 1 to the vision sensor 1 540-1, transmit the address information 2 to the vision sensor 2 540-2, and transmit the address information k to the vision sensor k 540-$k$. The processor 520 may transmit the determined items of address information at predetermined intervals.

The processor 520 may receive the event signal and the reference address information corresponding to the event signal from the reference vision sensor that generates the event signal in response to a light change event, among the vision sensors 540-1, 540-2, . . . , 540-$k$. The reference address information may be the address information received from the communicator 510 when the reference vision sensor generates the event signal.

The processor 520 may store the received event signal in the memory 530 based on the reference address information. The processor 520 may store the event signal in a memory area indicated by the reference address information.

The memory 530 may store the event signals received from the vision sensors 540-1, 540-2, . . . , 540-$k$. For example, the memory 530 may include a plurality of separate storages. The plurality of storages may be a plurality of areas logically divided in a single device to store event signals, or may be storages physically divided to store event signals.

The vision sensors 540-1, 540-2, . . . , 540-$k$ may be devices that time-asynchronously generate event signals in response to a light change event, and may communicate with the storing apparatus 500. The vision sensors 540-1, 540-2, . . . , 540-k may receive items of address information corresponding to the current time information from the communicator 510. Among the vision sensors 540-1, 540-2, . . . , 540-k, a reference vision sensor that time-asynchronously generates an event signal in response to a light change event may determine the address information received from the communicator 510 when the event signal is generated to be the reference address information. The reference vision sensor may transmit the generated event signal and the reference address information to the communicator 510.

Figure 6:
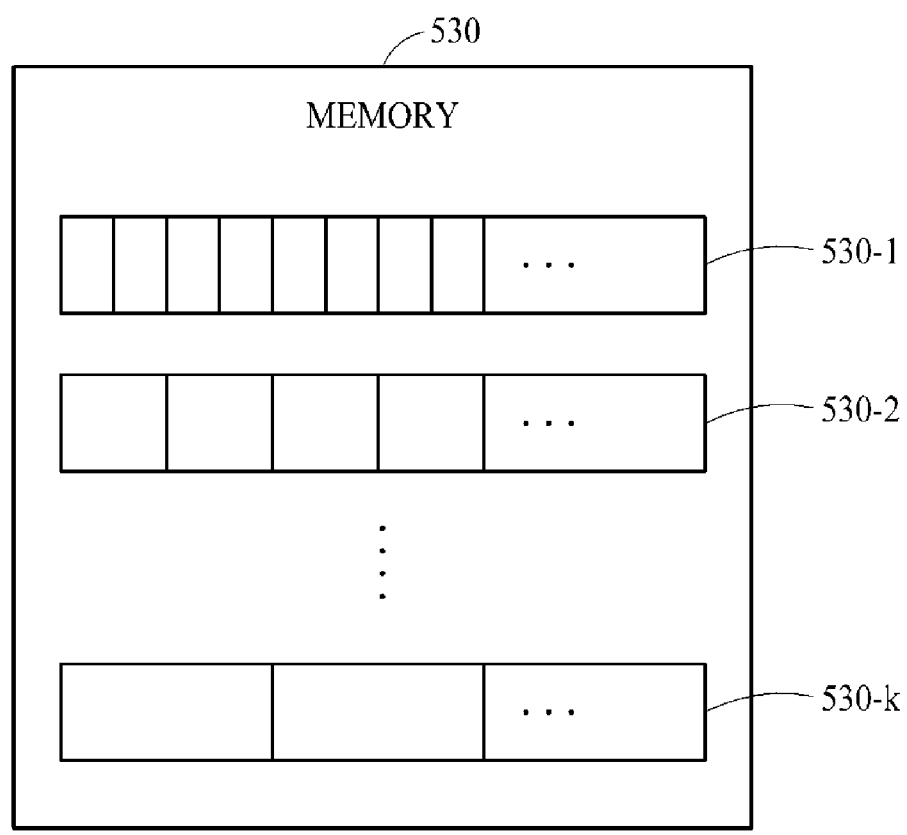
FIG. 6 is a block diagram illustrating a memory included in a storing apparatus, according to an exemplary embodiment.

FIG. 6 is a block diagram illustrating a memory 530 included in a storing apparatus, according to an exemplary embodiment.

Referring to FIG. 6, the memory 530 includes a plurality of storages 530-1, 530-2, . . . , and 530-k. For example, the plurality of storages 530-1, 530-2, . . . , and 530-k may be areas logically divided in a single device to store event signals, or may be storages physically divided to store event signals.

An event signal received from a reference vision sensor that generates the event signal, among vision sensors, may be stored in the memory 530 based on reference address information. The reference address information may be information indicating a memory area in which the received event signal is to be stored, in detail, address information received by the reference vision sensor from the storing apparatus when the event signal is generated. Current time information indicating a time at which the address information is transmitted from the storing apparatus to the reference vision sensor and identification information of the reference vision sensor may be mapped to the reference address information. Thus, the event signal received from the vision sensor may be stored in the memory 530 based on the current time information and the identification information of the reference vision sensor that are mapped to the reference address information.

The storing apparatus may store the event signal in the memory 530 based on the identification information of the reference vision sensor. The plurality of storages 530-1, 530-2, . . . , and 530-k may correspond to vision sensors. For example, the storage 1 530-1 may correspond to a vision sensor 1, and store an event signal received from the vision sensor 1. Similarly, the storage 2 530-2 may correspond to a vision sensor 2, and store an event signal received from the vision sensor 2. The storage k 530-k may correspond to a vision sensor k, and store an event signal received from the vision sensor k.

The storing apparatus may store the event signal in the memory 530 based on the current time information. Each of the plurality of storages 530-1, 530-2, . . . , and 530-k may be divided into a plurality of areas, each having a predetermined capability. The event signal may be stored in an area indicated by the reference address information to which the current time information is mapped, among the plurality of areas. For example, reference address information to which current time information T=a is mapped may indicate an n-th area among the plurality of areas, and an event signal received along with the reference address information may be stored in an n-th divided area. Similarly, reference address information to which current time information T=a+1 is mapped may indicate an (n+1)-th area, and an event signal received along with the reference address information may be stored in an (n+1)-th area. When there is no event signal received along with reference address information to which current time information T=a+2 is mapped, an event signal may not be stored in an (n+2)-th area.

The capabilities of the plurality of areas may be determined based on sensibilities of the corresponding vision sensors. In detail, each of the plurality of storages 530-1, 530-2, . . . , and 530-k may include a plurality of areas divided to have predetermined capabilities based on a sensibility of the corresponding vision sensor.

The vision sensors may have different sensibilities. The vision sensor 1 and the vision sensor 2 may generate different numbers of event signals in response to the same light change event. For example, when a sensibility of the vision sensor 2 is higher than a sensibility of the vision sensor 1, the vision sensor 2 may generate a larger number of event signals in response to the same light change event than the vision sensor 1. To store the generated event signal without omission, areas included in the storage 2 530-2 corresponding to the vision sensor 2 may have capabilities greater than capabilities of areas included in the storage 1 530-1.

FIG. 7 is a flowchart illustrating a storing method according to an exemplary embodiment.

The storing method of FIG. 7 may be performed by a processor included in a storing apparatus.

Referring to FIG. 7, in operation 710, the storing apparatus receives an event signal from a vision sensor. The storing apparatus may receive the event signal time-asynchronously generated in response to a light change event.

In operation 720, the storing apparatus stores the event signal in a memory based on event address information corresponding to time information related to a time at which the event signal is received. The event address information may be determined based on the time information, and indicate a memory area in which the event signal is to be stored. Further, the event address information may be uniquely mapped to the time information.

FIG. 8 is a flowchart illustrating a process of storing and outputting a generated image in response to range information, according to an exemplary embodiment.

Referring to FIG. 8, in operation 810, a storing apparatus receives range information related to event signals to be accessed. The range information may indicate a range of time information of an event signal to be accessed by a user, and include, for example, information related to a start time and an end time or information related to a start time and an interval.

In operation 820, the storing apparatus determines whether an image including the event signals is stored in a memory based on image address information corresponding to the range information. The storing apparatus may verify whether the image is stored in a memory area indicated by the image address information, thereby verifying whether the image is stored in the memory. The image address information may be mapped to the range information related to the event signals to be accessed, and indicate the memory area in which the image is to be stored. If the storing apparatus determines that the image is not stored in the memory, the storing apparatus continues in operation 830. If the storing apparatus determines that the image is partially stored in the memory, the storing apparatus continues in operation 840. If the storing apparatus determines that the image is stored in the memory, the storing apparatus continues in operation 870.

In operation 830, the storing apparatus generates an image based on the event signals belonging to the range information.

In a case in which only a portion, for example, a first portion, of the image is stored in the memory, in operation 840, the storing apparatus generates another portion, for example, a second portion, of the image, the other portion not being stored in the memory. The storing apparatus may generate the second portion by accumulating event signals corresponding to the second portion.

In operation 850, the storing apparatus generates the image corresponding to the range information by accumulating the generated portion and the stored portion. In operation 860, the storing apparatus stores the generated image and the range information in the memory based on the image address information. In operation 870, the storing apparatus outputs the stored image in response to the range information.

In operation 870, the storing apparatus may output the intact stored image in a case in which the image is stored in the memory.

FIG. 9 is a diagram illustrating a storing method according to another exemplary embodiment.

The storing method of FIG. 9 may be performed by a processor included in a storing apparatus 900 and a processor included in a reference vision sensor 910. The reference vision sensor 910 may be a vision sensor that generates an event signal in response to a light change event, among a plurality of vision sensors that communicate with the storing apparatus 900. For ease of description, the storing method will be described based on the storing apparatus 900 and the reference vision sensor 910.

In operation 901, the storing apparatus 900 determines address information corresponding to current time information. The storing apparatus 900 may determine the address information to which the current time information and identification information of the reference vision sensor 910 are mapped.

The current time information may indicate a time at which the address information is determined and transmitted to the reference vision sensor 910. The address information may be information indicating a predetermined area of a memory in which an event signal is to be stored.

In operation 902, the storing apparatus 900 transmits the determined address information to the reference vision sensor 910.

In operation 911, the reference vision sensor 910 generates an event signal in response to a light change event. The reference vision sensor 910 may time-asynchronously generate the event signal in response to an event in which light received from an object changes.

In operation 912, the reference vision sensor 910 transmits the event signal and reference address information to the storing apparatus 900. The reference vision sensor 910 may determine the address information received from the storing apparatus 900 when the event signal is generated to be the reference address information, and transmit the generated event signal and the reference address information to the storing apparatus 900.

In operation 903, the storing apparatus 900 stores the event signal in the memory based on the reference address information. The storing apparatus 900 may store the event signal in a memory area indicated by the reference address information.

Exemplary embodiments may store an event signal in a memory based on event address information corresponding to time information related to a time at which the event signal is received, thereby directly accessing stored event signals based on the time information without a necessity of linearly searching for the event signals.

Exemplary embodiments may store an event signal in a memory based on time information related to a time at which the event signal is received, thereby rapidly accessing an event signal without a necessity of checking a time stamp of the event signal and effectively reducing costs for a range search.

Exemplary embodiments may generate an image by accumulating event signals belonging to range information and store the generated image in a memory based on image address information corresponding to the range information, thereby efficiently utilizing the generated image without a necessity of regenerating the image once the image is generated.

Exemplary embodiments may store an event signal in a memory area indicated by reference address information to which current time information and identification information of a reference vision sensor are mapped, thereby rapidly searching for an event signal of a vision sensor to be accessed without using a separate hash function or look-up table.

Exemplary embodiments may use address information to which current time information is mapped, thereby effectively matching items of time information related to event signals time-asynchronously generated by a plurality of vision sensors.

Exemplary embodiments may not separately store a time stamp of an event signal when storing the event signal in a memory, thereby efficiently using the memory in which the event signal is stored.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A storing method of a storing apparatus configured to store an event signal generated by a dynamic vision sensor, the storing method comprising:
   receiving the event signal from the dynamic vision sensor, when an intensity of light from an object changes;

determining an event address corresponding to time information at which the event signal is received; and storing the event signal in a first area of a first memory of the storing apparatus, based on the event address, wherein the event address indicates the first area of the first memory in which the event signal is to be stored, and wherein the time information is a system time of the storing apparatus.

2. The storing method of claim 1, wherein the event address is determined using a hash function.

3. The storing method of claim 1, wherein the event address is uniquely mapped to the time information at which the event signal is received.

4. The storing method of claim 1, further comprising:
receiving range information of event signals to be accessed;
determining image address information of a second area of a second memory of the storing apparatus, based on the range information; and
determining whether an image comprising the event signals is stored in the second memory, based on the image address information.

5. The storing method of claim 4, wherein the determining whether the image is stored in the second memory comprises determining whether the image is stored in the second area corresponding to the image address information.

6. The storing method of claim 4, further comprising, in response to the determining that the image is not stored in the second memory:
generating the image comprising the event signals corresponding to the range information;
storing the image and the range information in the second area corresponding to the image address information; and
outputting the image that is stored.

7. The storing method of claim 4, further comprising, in response to the determining that a first portion of the image is stored in the second memory:
generating a second portion of the image, the second portion comprising at least one event signal that corresponds to the range information and is not stored in the second memory;
generating the image comprising the first portion and the second portion;
storing the image and the range information in the second area corresponding to the image address information; and
outputting the stored image.

8. The storing method of claim 4, further comprising outputting the stored image in response to the determining that the image is stored in the second memory.

9. A storing apparatus comprising:
a communicator configured to receive an event signal from a dynamic vision sensor, when an intensity of light from an object changes;
a first memory; and
a processor configured to:
determine an event address of a first area of the first memory, based on time information at which the event signal is received; and
store the event signal in the first area corresponding to the event address, wherein the time information indicates a system time of the storing apparatus.

10. The storing apparatus of claim 9, wherein the communicator is further configured to receive range information of event signals to be accessed, and
wherein the processor is further configured to:
determine image address information of a second area of a second memory based on the range information;
determine whether an image comprising the event signals is stored in the second memory based on the image address information; and
generate the image comprising the event signals corresponding to the range information, and store the image and the range information in the second area corresponding to the image address information, in response to the processor determining that the image is not stored in the second memory.

11. The storing apparatus of claim 9, wherein the event signal is asynchronously generated by the dynamic vision sensor.

12. An operating method of a storing apparatus, the operating method comprising:
receiving a first event signal in response to a first event, and a second event signal in response to second event, from a dynamic vision sensor;
determining a first event address and a second event address, when the first event signal and the second event signal are received, respectively;
storing the first event signal and the second event signal in a first area and a second area of a memory, based on the first event address and the second event address, respectively; and
generating an image by accumulating the first event signal and the second event signal,
wherein the first event address indicates the first area in which the first event signal is to be stored, and the second event address indicates the second area in which the second event signal is to be stored, and
wherein the first event address corresponds to a first system time of the storing apparatus at which the first event signal is received, and the second event address corresponds to a second system time of the storing apparatus at which the second event signal is received.

* * * * *